United States Patent
Tu et al.

(10) Patent No.: US 10,598,382 B2
(45) Date of Patent: Mar. 24, 2020

(54) IMPINGEMENT FILM-COOLED FLOATWALL WITH BACKSIDE FEATURE

(71) Applicant: United Technologies Corporation, Hartford, CT (US)

(72) Inventors: John S. Tu, West Hartford, CT (US); James B. Hoke, Tolland, CT (US); Monica Pacheco-Tougas, Waltham, MA (US); Alexander W. Williams, Windsor Locks, CT (US)

(73) Assignee: United Technologies Corporation, Farmington, CT (US)

( * ) Notice: Subject to any disclaimer, the term of this patent is extended or adjusted under 35 U.S.C. 154(b) by 578 days.

(21) Appl. No.: 14/935,076

(22) Filed: Nov. 6, 2015

(65) Prior Publication Data

US 2016/0131365 A1    May 12, 2016

Related U.S. Application Data

(60) Provisional application No. 62/076,867, filed on Nov. 7, 2014.

(51) Int. Cl.
| | |
|---|---|
| *F23R 3/16* | (2006.01) |
| *F23R 3/00* | (2006.01) |
| *F23R 3/06* | (2006.01) |
| *F23M 5/08* | (2006.01) |
| *B64D 27/10* | (2006.01) |
| *F02C 7/18* | (2006.01) |

(52) U.S. Cl.
CPC ............... *F23R 3/16* (2013.01); *B64D 27/10* (2013.01); *F02C 7/18* (2013.01); *F23M 5/085* (2013.01); *F23R 3/002* (2013.01); *F23R 3/005* (2013.01); *F23R 3/06* (2013.01); *F05B 2260/224* (2013.01); *F05D 2260/2214* (2013.01); *F23R 2900/03041* (2013.01); *F23R 2900/03043* (2013.01); *F23R 2900/03044* (2013.01); *F23R 2900/03045* (2013.01); *Y02T 50/675* (2013.01)

(58) Field of Classification Search
CPC .. F23R 3/06; F23R 3/002; F23R 3/005; F23R 3/16; F05B 2260/224; F05B 2260/2241; F05B 2260/221; F02C 7/18; F23M 5/08; F23M 5/085; B64D 27/10; F05D 2260/221; F05D 2260/2214; F05D 2260/22141
See application file for complete search history.

(56) References Cited

U.S. PATENT DOCUMENTS

| | | | |
|---|---|---|---|
| 2,253,025 A | 8/1941 | Fedden | |
| 4,695,247 A | 9/1987 | Enzaki et al. | |
| 5,253,471 A * | 10/1993 | Richardson | F23R 3/10 60/754 |

(Continued)

OTHER PUBLICATIONS

EP search report for EP15193727.3 dated Mar. 11, 2016.

(Continued)

*Primary Examiner* — Gerald L Sung
*Assistant Examiner* — Alain Chau
(74) *Attorney, Agent, or Firm* — Getz Balich LLC (57) ABSTRACT

A liner associated with an engine of an aircraft is described. The liner includes a panel and an array of projections configured to enhance a cooling of the panel and distributed on at least part of a first side of the panel that corresponds to a cold side of the panel.

8 Claims, 5 Drawing Sheets

(56) References Cited

U.S. PATENT DOCUMENTS

| | | | |
|---|---|---|---|
| 5,323,602 A * | 6/1994 | Defever | F23R 3/38 60/745 |
| 5,361,828 A | 11/1994 | Lee | |
| 5,402,754 A | 4/1995 | Gunnarsson | |
| 5,954,016 A | 9/1999 | Westerbeke | |
| 6,557,349 B1 * | 5/2003 | Young | F23R 3/002 60/39.11 |
| 6,701,714 B2 | 3/2004 | Burd | |
| 6,964,170 B2 * | 11/2005 | Alkabie | F23R 3/002 60/725 |
| 7,093,439 B2 * | 8/2006 | Pacheco-Tougas | F23R 3/002 60/752 |
| 7,219,498 B2 * | 5/2007 | Hadder | F23R 3/007 60/752 |
| 7,614,235 B2 * | 11/2009 | Burd | F23R 3/002 60/752 |
| 7,681,398 B2 * | 3/2010 | Patel | F02C 3/145 60/752 |
| 7,694,522 B2 | 4/2010 | Nakae | |
| 7,721,548 B2 * | 5/2010 | Patel | F23R 3/10 60/752 |
| 7,748,221 B2 * | 7/2010 | Patel | F23R 3/10 60/752 |
| 7,874,159 B2 * | 1/2011 | Gerendas | F23R 3/002 60/752 |
| 8,091,367 B2 * | 1/2012 | Alkabie | F23R 3/06 60/752 |
| 8,201,412 B2 * | 6/2012 | Dugar | F23R 3/002 60/39.37 |
| 8,453,460 B2 * | 6/2013 | Dugar | F23R 3/002 60/752 |
| 8,627,880 B2 | 1/2014 | Dittmann | |
| 8,650,882 B2 * | 2/2014 | Woolford | F23R 3/002 60/752 |
| 8,736,119 B2 | 5/2014 | Iwamoto | |
| 8,800,298 B2 | 8/2014 | Ladd | |
| 8,826,668 B2 | 9/2014 | Lee | |
| 9,052,111 B2 * | 6/2015 | Erbas-Sen | F23R 3/06 |
| 9,719,684 B2 * | 8/2017 | Pinnick | F23R 3/06 |
| 2003/0213250 A1 * | 11/2003 | Pacheco-Tougas | F23R 3/002 60/752 |
| 2004/0211188 A1 * | 10/2004 | Alkabie | F23R 3/002 60/772 |
| 2006/0053798 A1 * | 3/2006 | Hadder | F23R 3/007 60/772 |
| 2007/0193216 A1 * | 8/2007 | Woolford | F23R 3/002 52/782.1 |
| 2007/0218252 A1 | 9/2007 | Donald | |
| 2008/0115498 A1 * | 5/2008 | Patel | F23R 3/10 60/752 |
| 2008/0115499 A1 * | 5/2008 | Patel | F23R 3/10 60/752 |
| 2008/0115506 A1 * | 5/2008 | Patel | F02C 3/145 60/804 |
| 2010/0077763 A1 * | 4/2010 | Alkabie | F23R 3/06 60/754 |
| 2012/0317987 A1 | 12/2012 | Itzel | |
| 2013/0055722 A1 | 3/2013 | Verhiel | |
| 2013/0139514 A1 | 6/2013 | Varney | |
| 2013/0192262 A1 | 8/2013 | Eastwood | |
| 2013/0340437 A1 * | 12/2013 | Erbas-Sen | F23R 3/06 60/754 |
| 2014/0020393 A1 * | 1/2014 | Nakamata | F23R 3/002 60/754 |
| 2014/0083112 A1 | 3/2014 | Jause | |
| 2014/0090402 A1 | 4/2014 | Erbas-Sen et al. | |
| 2014/0096527 A1 | 4/2014 | Bangerter et al. | |
| 2014/0238028 A1 | 8/2014 | Yamane | |
| 2014/0260282 A1 * | 9/2014 | Pinnick | F23R 3/06 60/754 |
| 2014/0290256 A1 | 10/2014 | Fujimoto | |
| 2014/0290257 A1 | 10/2014 | Okita | |
| 2015/0013340 A1 * | 1/2015 | Pinnick | F23R 3/002 60/754 |
| 2015/0047364 A1 * | 2/2015 | Gao | F23R 3/46 60/774 |

OTHER PUBLICATIONS

U S Gawai, Matthew V K, Murtuza SD, "Experimental Investigation of Heat Transfer by PIN FIN", International Journal of Engineering and Innovative Technology (IJEIT), vol. 2, Issue 7, ISSN 2277-3754, Jan. 2013.

Sandeep S. Kore, "Experimental Investigations of Heat Transfer Enhancement From Dimpled Surface in a Channel", International Journal of Engineering Science and Technology (IJEST), vol. 3 No. 8, ISSN: 0975-5462, Aug. 2011.

Hideki Moriai, "Optical Measurement and Numerical Simulation Technologies for Aircraft Engine Combustor Development", Mitsubishi Heavy Industries Technical Review, vol. 48 No. 4, Dec. 2011.

J. J. Scrittore, "Investigation of Velocity Profiles for Effusion Cooling of a Combustor Liner", Transactions of the ASME, vol. 129, pp. 518-526, Jul. 2007.

* cited by examiner

IMPINGEMENT FILM-COOLED FLOATWALL WITH BACKSIDE FEATURE

This application claims priority to U.S. Patent Appln. No. 62/076,867 filed Nov. 7, 2014.

BACKGROUND

The thermal environment of a jet engine combustor poses challenges to hardware durability in association with the combustor chamber. The challenges include designing a cooling scheme to minimize/reduce: (1) the use of cooling air, (2) the maximum temperature, and (3) the temperature gradient. Conventionally, a combustor liner exposed to high temperatures (or potentially even fire/flame) utilizes an impingement film-cooled floatwall. Such a liner includes tailored impingement holes on an impingement sheet/shell and effusion holes on a panel coupled to the shell.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a liner associated with an engine of an aircraft, comprising: a panel, and an array of projections configured to enhance a cooling of the panel and distributed on at least part of a first side of the panel that corresponds to a cold side of the panel.

In some embodiments, a first density of projections in a first area of the panel is greater than a second density of projections in a second area of the panel. In some embodiments, the first area is prone to higher temperatures than the second area.

In some embodiments, a shell is coupled to the panel. In some embodiments, the shell comprises a plurality of impingement cooling holes. In some embodiments, a first density of impingement cooling holes in a first area of the shell is greater than a second density of impingement cooling holes in a second area of the shell. In some embodiments, the first area of the shell coincides with the first area of the panel, and the second area of the shell coincides with the second area of the panel.

In some embodiments, the projections are distributed over the entirety of the cold side of the panel.

In some embodiments, the projections are cylindrically-shaped.

In some embodiments, the projections have a diameter of approximately 0.0416 inches, a height of approximately 0.033 inches, and a center-to-center spacing of approximately 0.067 inches.

In some embodiments, the projections have a diameter within a range of 0.02 inches and 0.2 inches inclusive, and the projections have a height within a range of 0.02 inches and 0.4 inches inclusive, and the projections have a center-to-center spacing within a range of 0.02 inches and 0.6 inches inclusive.

In some embodiments, the projections are configured as at least one of pyramids, cones, tetrahedras, prisms, rectangles, ovals, pentagons, or hexagons.

In some embodiments, the panel includes at least one effusion cooling hole.

In some embodiments, the panel includes a plurality of effusion cooling holes. In some embodiments, a first density of effusion cooling holes in a first area of the panel is greater than a second density of effusion cooling holes in a second area of the panel. In some embodiments, the first area is prone to higher temperatures than the second area.

Aspects of the disclosure are directed to a system for an aircraft, comprising: a combustion engine, the combustion engine comprising a combustion chamber, a liner configured to at least partially encapsulate the combustion chamber, the liner including a panel, and an array of projections configured to enhance a cooling of the panel and distributed on a first side of the panel that corresponds to a cold side of the panel.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for cooling a liner (e.g., a liner panel) of an aircraft combustor. In some embodiments, an array of projections may be used to enhance cooling of the liner.

Figure 1A:
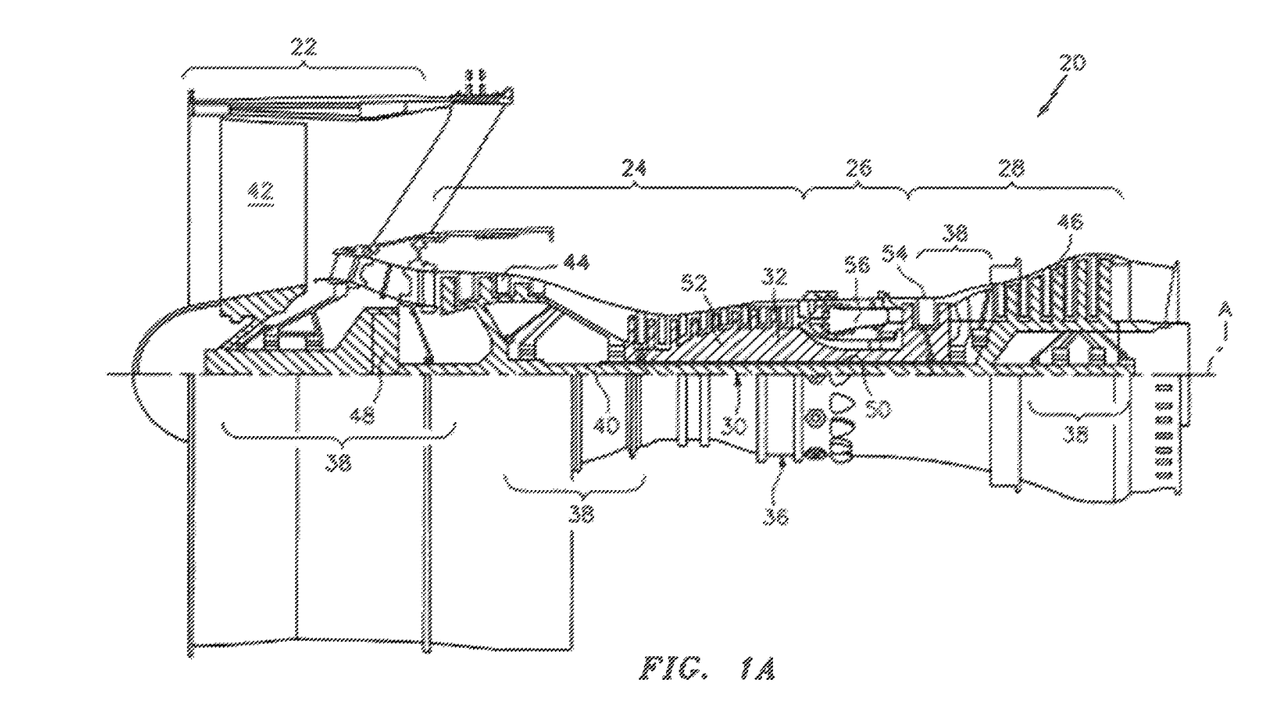
FIG. 1A is a schematic cross-section of an exemplary gas turbine engine.

FIG. 1A schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a LPC 44 of the compressor section 24 and a LPT 46 of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a HPC 52 of the compressor section 24 and HPT 54 of the turbine section 28. A combustor 56 is arranged between the HPC 52 and the HPT 54. The inner shaft 40 and the outer shaft 50 are concentric and rotate about the engine central longitudinal axis A that is collinear with their longitudinal axes. Core airflow is compressed by the LPC 44 then the HPC 52, mixed with the fuel and burned in the combustor 56, then expanded over the HPT 54 and the LPT 46. The LPT 46 and RPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 is designed for a particular flight condition—typically cruise at about 0.8 Mach and about 35,000 feet (10,668 meters). This flight condition, with the gas turbine engine 20 at its best fuel consumption, is also known as Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane System. The low Fan Pressure Ratio according to one, non-limiting, embodiment of the example gas turbine engine 20 is less than 1.45. Low Corrected Fan Tip Speed is the actual fan tip speed divided by an industry standard temperature correction of $("T"/518.7)^{0.5}$ in which "T" represents the ambient temperature in degrees Rankine. The Low Corrected Fan Tip Speed according to one non-limiting embodiment of the example gas turbine engine 20 is less than about 1,150 feet per second (351 meters per second).

Figure 1B:
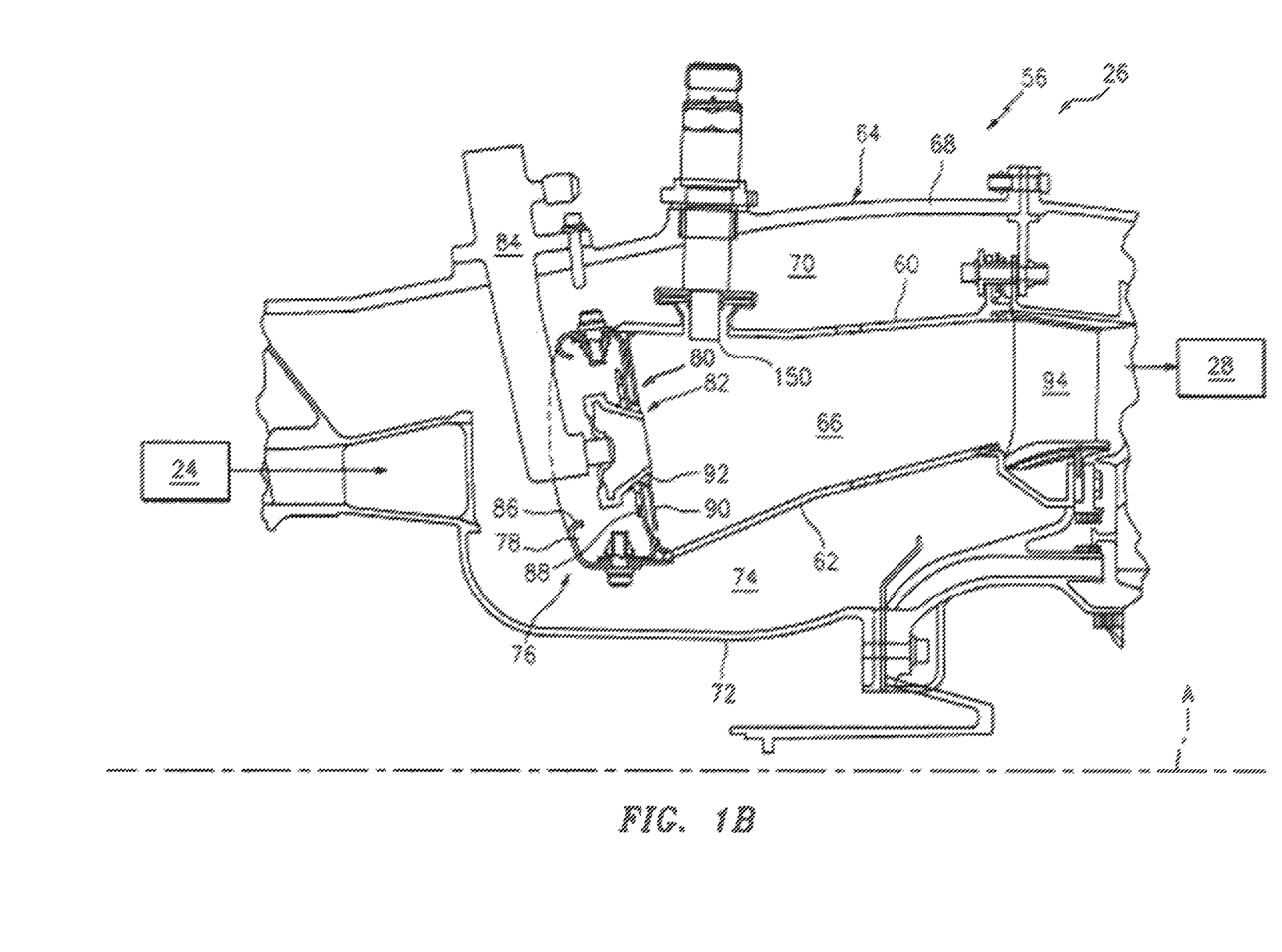
FIG. 1B is a partial cross-section of a combustor of the engine of FIG. 1A.

With reference to FIG. 1B, the combustor section 26 generally includes a single-walled combustor 56 with a multi-layered outer wall 60, a multi-layered inner wall 62, and a diffuser case module 64 that encases walls 60, 62. The outer wall 60 and the inner wall 62 are radially spaced apart such that an annular combustion chamber 66 is defined therebetween. The outer wall 60 is spaced radially inward from an outer diffuser case 68 of the diffuser case module 64 to define an outer annular plenum 70. The inner wall 62 is spaced radially outward from an inner diffuser case 72 of the diffuser case module 64 to define an inner annular plenum 74. The term "single-walled combustor" reflects the difference between more traditional combustors that utilize a dual-walled orientation with the inner and outer walls each having a shell spaced from a liner. It should be understood that although a particular combustor is illustrated, other combustor types with various combustor wall arrangements will also benefit, including double-walled combustors. It should be further understood that the disclosed cooling flow paths are but an illustrated embodiment and should not be limited.

The combustion chamber 66 contains the combustion products that flow axially toward the turbine section 28. Each combustor wall 60, 62 may be generally cylindrical and extend circumferentially about the engine axis. The walls 60, 62 may each be a single panel or formed utilizing a plurality of panels. The panel(s) may be circumferentially continuous (e.g., ring shaped) and divided axially, may be divided circumferentially from each, or both (e.g., substantially rectilinear in shape).

The combustor 56 further includes a forward assembly 76 immediately downstream of the compressor section 24 to receive compressed airflow therefrom. The forward assembly 76 generally includes an annular hood 78, a bulkhead assembly 80, and a plurality of swirlers 82 (one shown). Each of the swirlers 82 is circumferentially aligned with one of a plurality of fuel nozzles 84 (one shown) and a respective one of a plurality of hood ports 86. The bulkhead assembly 80 includes a bulkhead support shell 88 secured to the combustor walls 60, 62, and a plurality of circumferentially distributed bulkhead heat shields or panels 90 secured to the bulkhead support shell 88 around each of a respective swirler opening 92. The bulkhead support shell 88 is generally annular and the plurality of circumferentially distributed bulkhead panels 90 are segmented, typically one to each fuel nozzle 84 and swirler 82. It is further contemplated and understood that the heat shield(s) 90 and support shell(s) 88 may be replaced with a multi-layered, single, wall similar to the walls 60, 62.

The annular hood 78 extends radially between, and is secured to, the forwardmost ends of the combustor walls 60, 62. Each one of the plurality of circumferentially distributed hood ports 86 receives a respective one of the plurality of fuel nozzles 84 and facilitates the direction of compressed air into the forward end of the combustion chamber 66 through the swirler opening 92. Each fuel nozzle 84 may be secured to the diffuser case module 64 and projects through one of the hood ports 86 into the respective swirler opening 92.

The forward assembly 76 introduces core combustion air into the forward section of the combustion chamber 66 while the remainder enters the outer annular plenum 72 and the inner annular plenum 74. The plurality of fuel nozzles 84 and adjacent structure generate a blended fuel-air mixture that supports stable combustion in the combustion chamber 66.

Opposite the forward assembly 76, the outer and inner walls 60, 62 may be mounted adjacent to a first row of Nozzle Guide Vanes (NGVs) 94 in the HPT 54. The NGVs 94 are static engine components that direct core airflow combustion gases onto the turbine blades of the first turbine rotor in the turbine section 28 to facilitate the conversion of pressure energy into kinetic energy. The core airflow combustion gases are also accelerated by the NGVs 94 because of their convergent shape and are typically given a "spin" or a "swirl" in the direction of turbine rotor rotation. The turbine rotor blades absorb this energy to drive the turbine rotor at high speed.

Figure 2:
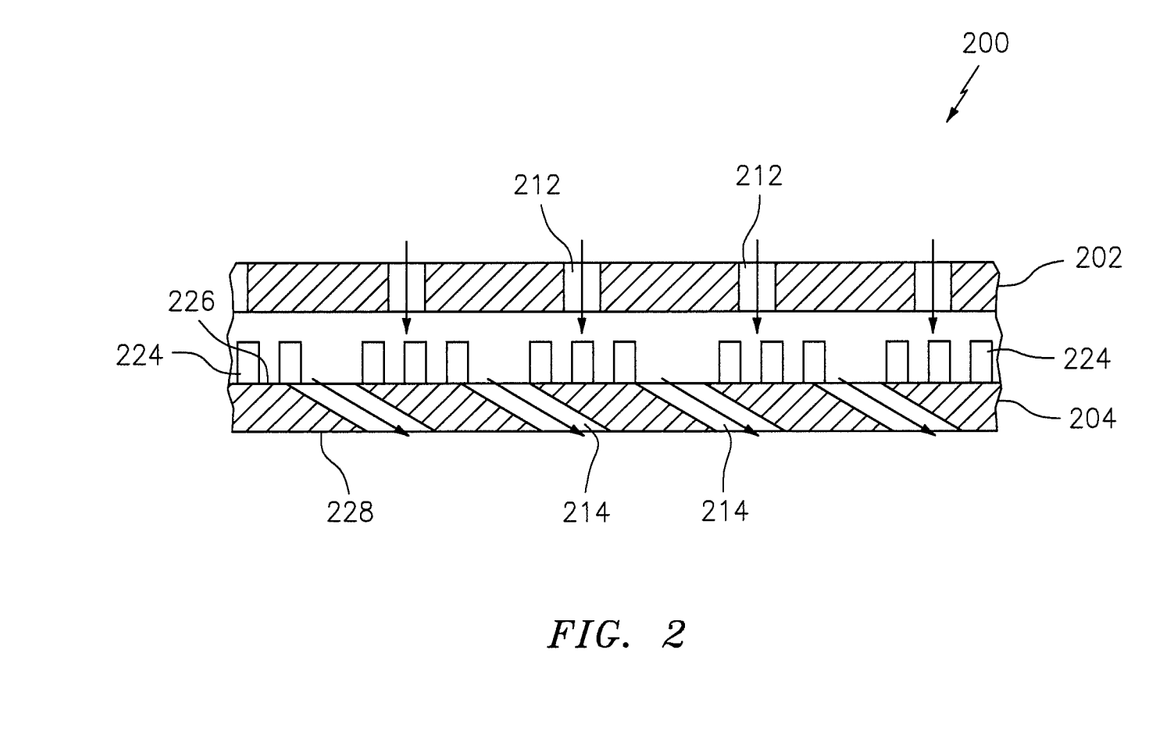
FIG. 2 illustrates a liner associated with the engine of FIG. 1A.

Referring to FIG. 2, a combustor liner 200 associated with the engine 20 of FIG. 1 is shown. The liner 200 includes a shell 202 and a panel 204. The liner 200 and/or the panel 204 may be configured to at least partially encapsulate the combustion chamber 66.

The panel 204 may be in closer proximity to the combustion chamber 66 than the shell 202, such that the panel 204 may be hotter than the shell 202 when the engine 20 is being operated. Aspects of the disclosure may be used to cool the liner 200, and in particular, the panel 204.

The shell 202 may include impingement cooling holes 212 for providing a cooling fluid (e.g., cooling air) to the panel 204. The panel 204 may include effusion cooling holes 214, which may be used for removing heat from the panel 204 via the cooling fluid (e.g., cooling air) that impinges upon the panel 204.

In FIG. 2, the liner 200 is also shown as including one or more projections/pin-fins 224 coupled to the panel 204. The pin-fins 224 may be used to enhance the cooling of the panel 204 beyond the cooling provided by the impingement cooling holes 212 and the effusion cooling holes 214. Such additional cooling may be provided by virtue of the pin-fins 224 presenting a large surface area for a cooling flow to enable enhanced heat transfer (e.g., removal of heat from the panel 204).

The liner 200 may include additional features not shown in FIG. 2. For example, one or more rails may be used to couple the shell 202 and the panel 204 to one another to prevent leakage. Grommets may be used in proximity to dilution cooling holes that are used to regulate/maintain combustion within the engine 20. Rails and grommets represent examples of 3D features. As used herein, 3D features represent areas or regions where it may be difficult, if not impossible, to include holes (e.g., impingement cooling holes 212 and/or effusion cooling holes 214) without potentially compromising the structure of the liner 200.

As one of skill in the art would appreciate, the panel 204 may not be prone to a uniform temperature over the entirety of the panel 204. For example, areas may develop where the temperature is prone to be greater than at other locations or areas. Aspects of the disclosure, including a provisioning of the pin-fins 224 on the backside/cold side 226 of the panel 204 (e.g., on the side 226 of the panel 204 that is opposite to the (hot) side 228 of the panel 204), may be used in an effort to obtain a more uniform distribution of temperature across/throughout the panel 204.

In areas of the liner 200/panel 204 where the temperature is less than a first threshold, which areas may be referred to as so-called cold spots, the liner 200 (or a portion thereof) may be fabricated/configured to include impingement cooling holes 212 and pin-fins 224. The cold spots may also include a number of effusion cooling holes 214.

In areas of the liner 200/panel 204 where the temperature is typically greater than or equal to the first threshold (hot spots), the liner 200 may be fabricated/configured to include impingement holes 212, pin-fins 224, and effusion cooling holes 214. To the extent that effusion cooling holes 214 are included in the area of cold spots, more effusion cooling holes 214 may be included in the area of hot spots than in cold spots.

In some embodiments, additional resolution may be provided for. For example, spots of the liner 200/panel 204 may be designated as being one of: (1) very cold, (2) cold, (3) medium, (4) hot, and (5) very hot. More generally, any grade or classification arrangement may be used in terms of the temperatures experienced in various locations or areas of the liner 200/panel 204. A selection may be made for such locations or areas in terms of the provisioning of one or more of impingement cooling holes 212, effusion cooling holes 214, or pin-fins 224.

Figure 3:
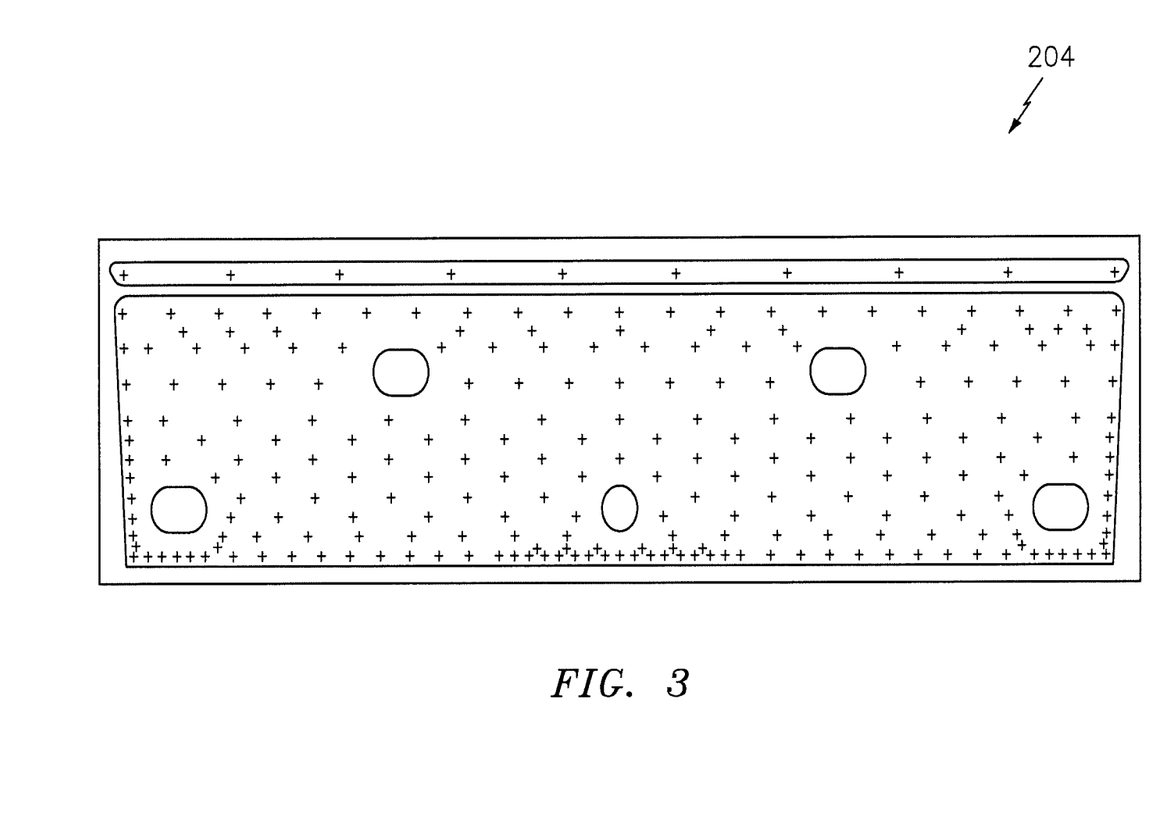
FIG. 3 illustrates a footprint of impingement cooling holes about a panel of the liner of FIG. 2.

To the extent the pin-fins 224 are included in a given location or area of a liner 200, the pin-fins 224 may present resistance to the flow of cooling fluid (e.g., air). To counter this potential loss of flow, additional impingement cooling holes 212 may be included in proximity to the locations of the pin-fins 224. FIG. 3 illustrates an example footprint for the impingement cooling holes 212 (reflected via '+' signs) on the panel 204. As reflected in FIG. 3, the distribution or density (count per unit volume or count per unit area) of the impingement cooling holes 212 may vary, where the distribution of the impingement cooling holes 212 may be most dense in proximity to (a large count of) the pin-fins 224 for one or more given areas. In this manner, a large density of impingement cooling holes 212 may coincide with a large density of pin-fins 224 for a given area.

The introduction of the pin-fins 224 may result in an increase in terms of the impingement cooling holes 212 that are used in a range of 5%-10% relative to an embodiment that does not utilize pin-fins 224. The introduction of the pin-fins 224 might not result in any change in terms of the count or number of effusion cooling holes 214 that are used.

Figure 4:
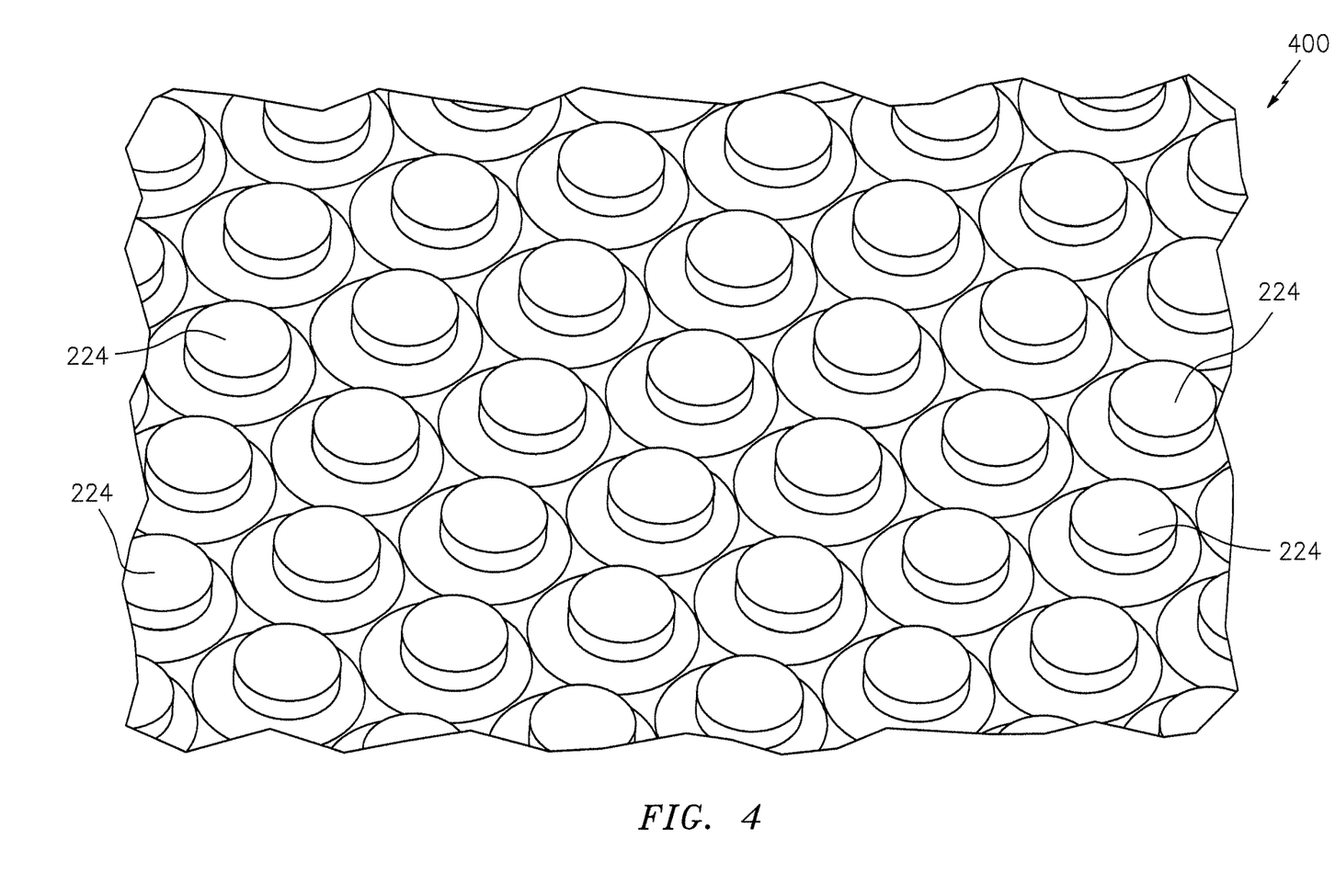
FIG. 4 illustrates an exemplary array of projections in accordance with an embodiment.

Referring to FIG. 4, an array 400 of pin-fins 224 is shown in accordance with aspects of the disclosure. In some embodiments, each of the pin-fins 224 may have a diameter of approximately 0.0416 inches (1.0566 millimeters), a height of approximately 0.033 inches (0.838 millimeters), and a center-to-center spacing of approximately 0.067 inches (1.702 millimeters). Of course, other values for the diameter, height, and/or center-to-center spacing may be used in a given embodiment. For example, the diameter may range from about 0.02 inches (0.508 millimeters) to about 0.2 inches (5.08 millimeters) inclusive, the height may range from about 0.02 inches (0.508 millimeters) to about 0.4 inches (10.16 millimeters) inclusive, and the center-to-center spacing may range from about 0.02 inches (0.508 millimeters) to about 0.6 inches (15.24 millimeters) inclusive. Moreover, while the pin-fins 224 are shown as being cylindrically-shaped in FIG. 4, other shapes or configurations may be used. For example, pyramids, cones, tetrahedras, prisms, rectangles, ovals, pentagons, hexagons, etc., may be used.

Technical effects and benefits of this disclosure include a cost-effective design for cooling a combustor liner (e.g., a panel of a liner) and enhancing reliability/availability of the liner and associated hardware. Cooling may be provided via an incorporation of one or more pin-fins in accordance with one or more of the configurations described herein. An array of one or more of pin-fins can be added to a panel to enhance heat transfer. Portions of the array may be placed over the entirety of a surface of the panel or at selective locations of the panel. The use of the array may enable a removal of cooling holes at one or more locations. Aspects of the disclosure may be used to realize an increase in heat flow extraction by approximately 50% compared to a combination of impingement cooling and effusion cooling.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A liner associated with an engine, comprising:
   a panel;
   a shell coupled to the panel; and
   an array of projections configured to enhance a cooling of the panel and distributed on at least part of a first side of the panel that corresponds to a cold side of the panel,
   wherein the shell comprises a plurality of impingement cooling holes and the panel comprises a plurality of effusion cooling holes,
   wherein a first density of the projections and effusion cooling holes in a first area of the panel is greater than a second density of the projections and effusion cooling holes in a second area of the panel,
   wherein a first density of the impingement cooling holes in a first area of the shell is greater than a second density of the impingement cooling holes in a second area of the shell,
   wherein the first area of the shell coincides with the first area of the panel and the second area of the shell coincides with the second area of the panel, and
   wherein the impingement holes of the first density of impingement holes and the second density of the impingement holes are directed at the projections of the first density of projections and the second density of the projections, respectively.

2. The liner of claim 1, wherein the first area of the panel is subject to higher temperatures than the second area of the panel.

3. The liner of claim 1, wherein the projections are distributed over the entirety of the cold side of the panel.

4. The liner of claim 1, wherein the projections are cylindrically-shaped.

5. The liner of claim 1, wherein the projections have a diameter of 0.0416 inches, a height of 0.033 inches, and a center-to-center spacing of 0.067 inches.

6. The liner of claim 1, wherein the projections have a diameter within a range of 0.02 inches and 0.2 inches inclusive, and wherein the projections have a height within a range of 0.02 inches and 0.4 inches inclusive, and wherein the projections have a center-to-center spacing within a range of 0.02 inches and 0.6 inches inclusive.

7. The liner of claim 1, wherein the projections are configured as at least one of pyramids, cones, tetrahedras, prisms, rectangles, ovals, pentagons, or hexagons.

8. A system for an aircraft, comprising:
   a combustion engine, the combustion engine comprising a combustion chamber;
   a liner configured to at least partially encapsulate the combustion chamber, the liner including a panel and a shell; and
   an array of projections configured to enhance a cooling of the panel and distributed on a first side of the panel that corresponds to a cold side of the panel,
   wherein the shell comprises a plurality of impingement cooling holes and the panel comprises a plurality of effusion cooling holes,
   wherein a first density of the projections and effusion cooling holes in a first area of the panel is greater than a second density of the projections and effusion cooling holes in a second area of the panel,
   wherein a first density of the impingement cooling holes in a first area of the shell is greater than a second density of the impingement cooling holes in a second area of the shell,
   wherein the first area of the shell coincides with the first area of the panel, and wherein the second area of the shell coincides with the second area of the panel, and
   wherein the impingement holes of the first density of impingement holes and the second density of the impingement holes are directed at the projections of the first density of projections and the second density of the projections, respectively.

\* \* \* \* \*